United States Patent [19]

Kano

[11] Patent Number: 5,272,577
[45] Date of Patent: Dec. 21, 1993

[54] INDEX ADJUSTMENT CIRCUIT FOR FLOPPY DISK DRIVE

[75] Inventor: Ikuo Kano, Hanamaki, Japan

[73] Assignee: Matsushita Electric Industrial Co., Ltd., Osaka, Japan

[21] Appl. No.: 668,181

[22] Filed: Mar. 12, 1991

[30] Foreign Application Priority Data

Mar. 16, 1990 [JP] Japan .................. 2-067743

[51] Int. Cl.$^5$ .................. G11B 15/18; G11B 15/52
[52] U.S. Cl. .................. 360/69; 360/73.03; 360/132
[58] Field of Search .................. 360/69, 73.03, 132

[56] References Cited

U.S. PATENT DOCUMENTS

| | | | |
|---|---|---|---|
| 4,815,063 | 3/1989 | Aoshima et al. | 360/73.03 |
| 4,908,810 | 3/1990 | Oie | 360/73.03 |
| 5,068,755 | 11/1991 | Hamilton et al. | 360/69 |
| 5,150,340 | 9/1992 | Miura et al. | 360/69 |

OTHER PUBLICATIONS

L. R. Bellamy et al., "Disk Drive Motor Speed Control" IBM Technical Disclosure Bulletin vol. 23 No. 11 Apr. 1981 p. 5163.

*Primary Examiner*—John Zazworsky
*Attorney, Agent, or Firm*—Stevens, Davis, Miller & Mosher

[57] ABSTRACT

A floppy disk drive (FDD) includes a writable non-volatile memory which stores information indicative of a correction amount due to a difference between the reference position of a medium for the FDD and the position of an index detected by an index sensor and a digital delay circuit for deciding an adjustment time by producing an index signal which is provided by delaying the index detection pulse supplied from the index sensor by a count value corresponding to the correction amount supplied from the non-volatile memory. The index adjustment pulse is delayed by the count value so that the relative positions of indices of several FDD's can be made coincident with each other.

1 Claim, 6 Drawing Sheets

F I G. 1
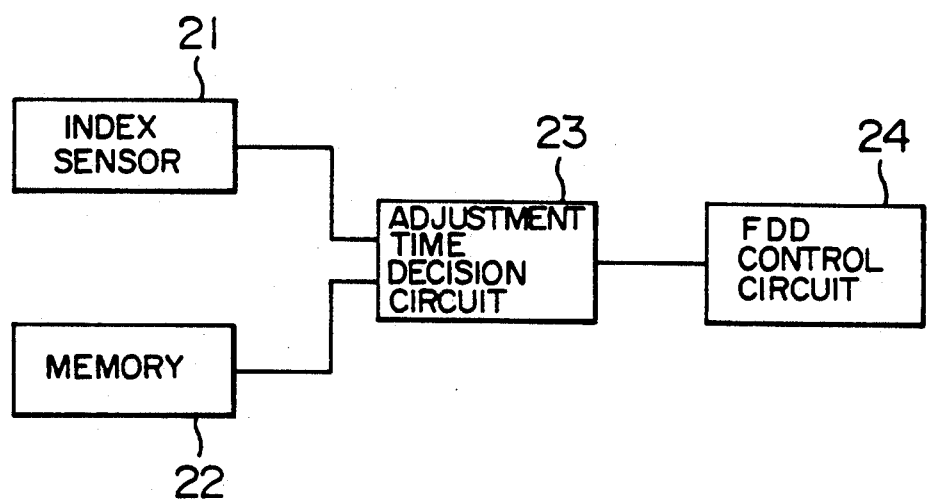

INDEX ADJUSTMENT CIRCUIT FOR FLOPPY DISK DRIVE

BACKGROUND OF THE INVENTION

The present invention relates to a floppy disk drive (FDD) for an information processing device, etc., and more particularly to a circuit for adjusting the index of a medium for the FDD.

FIGS. 5A to 5C are plan views showing the conventional 8-inch, 5.25-inch and 3.5-inch floppy disk drive (hereinafter referred to as FDD as necessity requires), respectively. As seen from FIGS. 5A and 5B, each medium of the 8-inch FDD 1 and the 5-inch FDD 1 is provided with an index hole 1a which serves to detect one index pulse produced whenever the FDD 1 makes one revolution, thereby determining the start point of the rotating FDD 1. The index pulse is produced in such a manner that the index hole 1a is optically detected through a hole made in a jacket or cartridge to be converted into an electrical signal.

On the other hand, the medium of the 3.5-inch FDD as shown in FIG. 5C has no index hole. In order to detect the index therefor in terms of an index pulse, a reflection plate is attached in the outer periphery of a rotor and a reflective photo-interrupter is also provided so as to be opposite to the reflection plate; the rotor is integrally formed with a spindle motor of a chucking mechanism for clamping the FDD. When the reflection plate is opposite to the photo-interrupter due to one revolution of the rotor, the above index pulse is produced each revolution of the FDD.

The index pulse will be used to indicate a reference position from which data read or write for the medium is started.

FIG. 6 is a sectional view of the medium chucking mechanism for clamping the above 3.5-inch FDD with no index hole. As seen from FIG. 6, a medium composed of a metallic hub 2 and a disk 3 is fixed to a spindle motor composed of a rotor 6 and a driving coil 7 by means of a spindle hub including a chucking magnet 4 and a driving pin 5.

An explanation will be given of a procedure of chucking the FDD with reference to FIGS. 7A to 7C. FIG. 7A is a plan view when the FDD 1 is mounted on the chucking mechanism. FIG. 7B is a plan view when positioning the FDD 1 is started. FIG. 7C is a plan view when positioning the FDD is completed.

First, as seen from FIG. 7A, the metallic hub 2 for the FDD 1 is adsorbed onto the chucking magnet 4 of the spindle and a spindle shaft 10 is inserted into a chucking hole 8. Next, as seen from FIG. 7B, the driving pin 5 enters a positioning hole 9 of the medium. Finally, as seen from FIG. 7C, the position of the medium is accurately fixed by the spindle shaft 10 and the driving pin 5. Thus, positioning of the FDD has been completed.

It should be noted that the positional relationship between the driving pin 5 and the reflecting plate of the spindle motor is fixed so that the position of starting read or write for the medium and that of the reflection plate when the FDD 1 has been clamped in its chucking mechanism are also fixed. However, the position of the reflection place when assembling the spindle motor may deviate slightly.

Meanwhile, in some FDD control devices, data read is inhibited during a certain period immediately after the index pulse has been produced. Therefore, in FDD's when using such a FDD control circuit, in many cases, relative positions of the indices for these FDD's are made coincident.

In order to remove the above positional deviation, the index adjustment circuit as shown in FIG. 8 has been conventionally used. The index adjustment circuit of FIG. is composed of an index sensor 11, a timer circuit 12 comprising a resistor, a variable resistor, a capacitor, etc. and a control circuit 13.

In operation, an input index waveform from the index sensor 11 is delayed by the timer 12, and its read/write timing is taken by the control circuit 13.

Thus, the conventional circuit arrangement can adjust the index waveform by changing values of the resistor and the capacitor.

However, since the conventional index adjustment device for the FDD user the capacitor and the resistor and the variable resistor the value of which is to be adjusted using the robot provided in the timer circuit, its reliability may be influenced by ambient conditions of temperature, used voltage, shock, etc.

SUMMARY OF THE INVENTION

An object of the present invention is to solve the above problem and provide an excellent floppy disk drive which is immune to influences such as an ambient temperature, used voltage, added shock, and can abolish the adjustment of the variable resistor by using a robot.

In order to attain the above object of the present invention, there is provided a floppy disk drive (FDD) comprising a writable non-volatile memory which stores information indicative of a correction amount due to a difference between the reference position of a medium for the FDD and the position of an index detected by an index sensor, an adjustment time decision circuit constructed by a digital delay circuit for producing an index signal which is provided by delaying the index detection pulse supplied from the index sensor by a count value corresponding to the correction amount supplied from the non-volatile memory, wherein the index detection pulse is delayed by the count value thereby to make coincident the relative positions of indices of several FDD's.

In accordance with the present invention, the index detection pulse is delayed by the correction amount stored in the memory so that an adjustment time can be set in a digital manner. Thus, the floppy disk drive according to the present invention is immune to variations in environmental conditions such as ambient temperature, used voltage and added shock, thereby enhancing its reliability. Further, provision of the resistor and capacitor in the timer circuit is not required, and adjustment of the variable resistor using a robot is not required.

BRIEF DESCRIPTION OF THE DRAWINGS

FIG. 1 is a schematic block diagram of the floppy disk drive (FDD) according to one embodiment of the present invention;

DESCRIPTION OF THE PREFERRED EMBODIMENTS

FIG. 1 shows the arrangement of the FDD according to one embodiment of the present invention. In FIG. 1, 21 is an index sensor which magnetically or optically detects the index position of a medium for FDD. 22 is a writable non-volatile memory which stores, in index adjustment, the information indicative of a correction amount due to a difference between the reference position of the medium for the FDD and the position of an index detected by the index sensor. 23 is an adjustment time decision circuit constructed by a digital delay circuit which serves to delay the leading edge of an index detection pulse supplied from the index sensor 21 using the count value corresponding to the correction amount information supplied from the memory 22. FDD control circuit 24 serves to decide the reference position of a track of the medium using the index signal supplied from the adjustment time decision circuit 23, to thereby control the FDD.

An explanation will be given for the operation of the FDD according to this embodiment. First, the index sensor 21, when it detects an index of the medium, produces an index detection pulse. This index detection pulse is supplied to the adjustment time decision circuit 23. In response to the index detection pulse supplied, the adjustment time decision circuit 23 starts to count clocks at the frequency of 128 per us supplied from the memory 22. When the count reaches a count value determined by the information stored in the memory 22, the adjustment time decision circuit 23 supplies an index signal to the FDD control circuit 24 which decides the reference position of a track of the medium thereby to control the FDD.

As mentioned above, stored in the memory 22 is the information indicative of a correction amount based on a difference between the reference position of the medium and the position of an index detected by the index sensor. The initial value of the correction amount is set at zero. The reference position can be stored by reading the reference position from a reference medium. Its difference from the index position detected by the index sensor 21 can be measured by an FDD tester (not shown). The correction amount corresponding to the difference can be stored using the tester. By this process, the adjustment time decision circuit 23 is ready for deciding the adjustment time.

Figure 2:
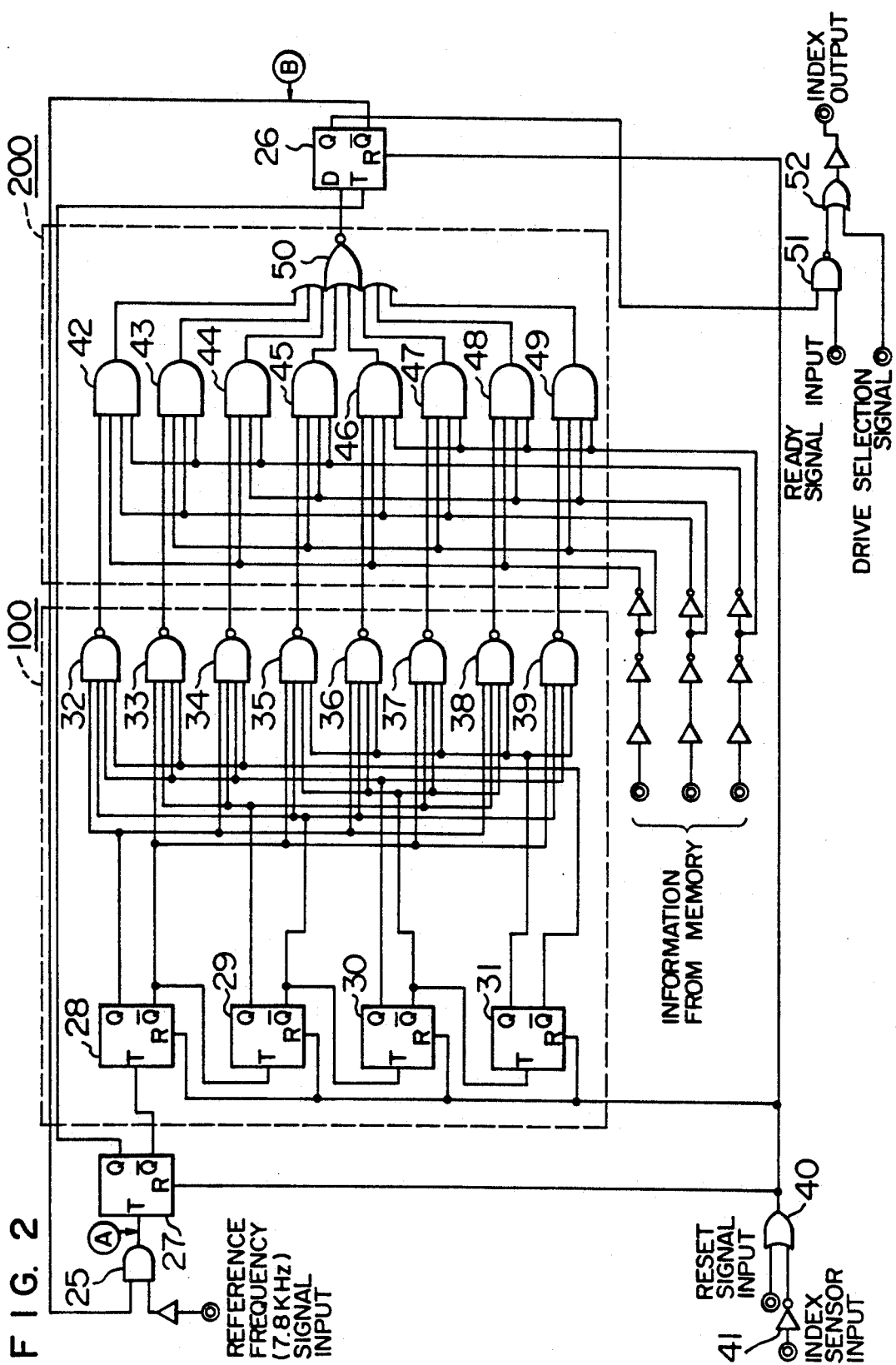
FIG. 2 is a circuit diagram of a specific example of an adjustment time decision circuit in the disk drive.

FIG. 2 is a circuit diagram of a concrete example of the adjustment time decision circuit 23.

In FIG. 2, 25 is an AND gate which takes a logical product of a reference frequency (7.8 kHz) signal and an output from the terminal $\bar{Q}$ of a flip-flop 26; the logical product is supplied to the terminal T of a flip-flop 27. An output from the terminal Q of the flip-flop 27 is sent to the terminal T of the flip-flop 26 whereas an output from the terminal $\bar{Q}$ of the flip-flop 27 is sent to the terminal T of a flip-flop 28.

100 denotes a counter circuit composed of flip-flops 28 to 31 and four-input NAND gates 32 to 39. A reset signal is input through an OR gate 40 to the respective terminals R's of the flip-flops 28 to 31 in the counter circuit 100 and the respective terminals R's of the flip-flops 26 and 27, and an output from the index sensor 21 is also sent through an inverter 41 and the OR gate 40 to these terminals R's. An output from the terminal Q of the flip-flop 28 is sent to the respective first input terminals of the NAND gates 32, 34, 36 and 38 whereas an output from the terminal $\bar{Q}$ of the flip-flop 28 is sent to the respective first input terminals of the NAND gates 33, 35, 37 and 39 and the terminal T of the flip-flop 29. An output from the terminal $\bar{Q}$ of the flip-flop 29 is sent to the respective second input terminals of the NAND gates 33, 34, 37 and 38 whereas an output from the terminal Q of the flip-flop 29 is sent to the respective second input terminals of the NAND gates 32, 35, 36 and 39 and the terminal T of the flip-flop 30. An output from the terminal Q of the flip-flop 30 is sent to the respective third input terminals of the NAND gates 32, 33, 34 and 39 whereas an output from the terminal $\bar{Q}$ of the flip-flop 30 is sent to the respective first input terminals of the NAND gates 35, 36, 37 and 38 and the terminal T of the flip-flop 31. An output from the terminal Q of the flip-flop 31 is sent to the respective fourth input terminals of the NAND gates 35, 36, 37, 38 and 39 whereas an output from the terminal $\bar{Q}$ of the flip-flop 31 is sent to the respective fourth input terminals of the NAND gates 32, 33 and 34.

On the other hand, 200 in FIG. 2 denotes a separator circuit composed of four-input AND gates 42 to 49 and an eight-input NOR gate 50.

The respective outputs from the NAND gates 32 to 39 are sent to the respective first input terminals of the AND gates 42 to 49. A non-inverted signal of the first information relative to a correction amount supplied from the memory 22 of FIG. 1 is sent to the respective second input terminals of the AND gates 42, 44, 46 and 48 whereas its inverted signal is sent to those terminals of the AND gates 43, 45, 47 and 49. A non-inverted signal of the second information relative to a correction amount supplied from the memory 22 of FIG. 1 is sent to the respective third input terminals of the AND gates 42, 45, 46 and 47 whereas its inverted signal is sent to those terminals of the AND gates 44, 45, 48 and 49. An non-inverted signal of the third information relative to a correction amount supplied from the memory 22 of FIG. 1 is sent to the respective fourth input terminals of the AND gates 42, 43, 44 and 45 whereas its inverted signal is sent to those terminals of the AND gates 46 to 49.

Outputs from the AND gates 42 to 49 are sent to the first to eighth input terminals of the NOR gate 50, respectively, whereas an output from the NOR gate is sent to the terminal T of the flip-flop 26. An output from the terminal $\bar{Q}$ of the flip-flop 26 is sent to the first input terminal of the AND gate 25.

51 in FIG. 2 denotes a NAND gate. An output from the terminal Q of the flip-flop 26 is supplied to the first input terminal of NAND gate 51 whereas a ready signal is supplied to the second input terminal thereof. Thus, the NAND gate 51 takes a logical product of both inputs.

52 in FIG. 2 denotes an OR gate. An output from the NAND gate 51 and a drive selection signal are supplied to the first and second input terminal of the OR gate 52. The OR gate 52 takes a logical sum of both inputs which is to be sent to the FDD control circuit 24 as shown in FIG. 1.

Figure 3:
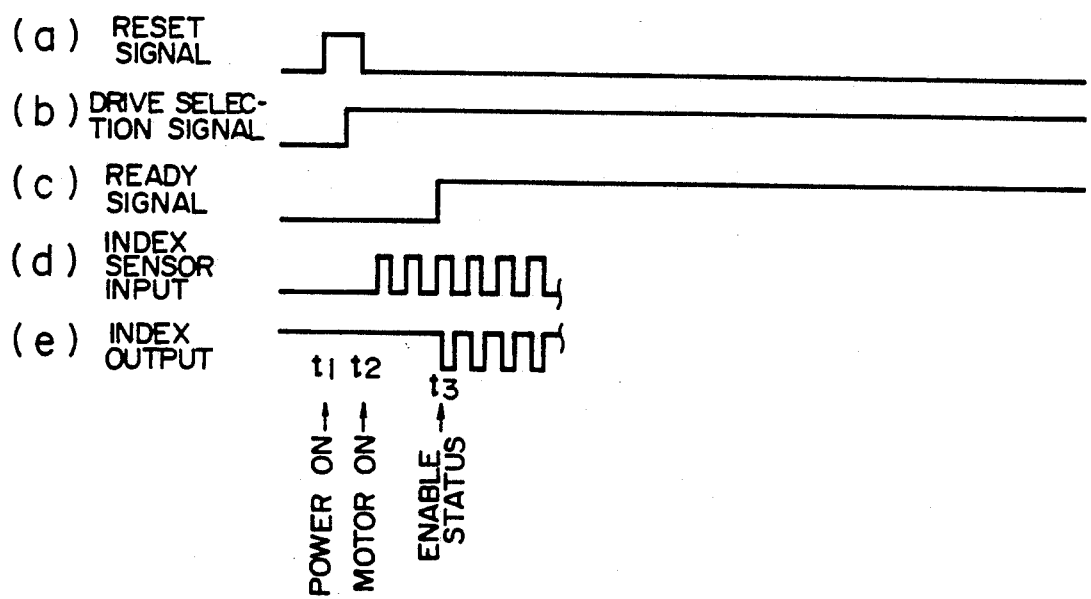
FIG. 3 shows timing charts for illustrating the entire operation of the disk drive.
Figure 4:
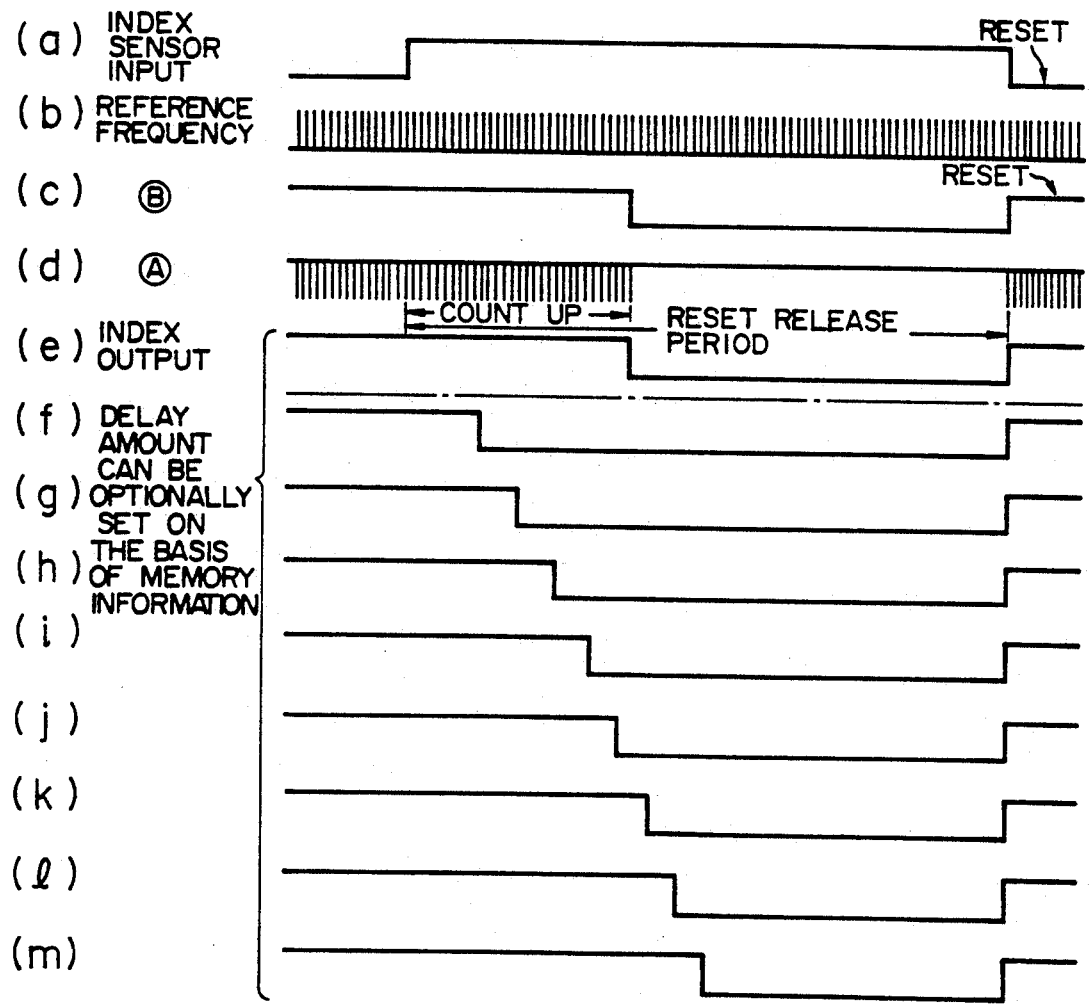
FIG. 4 shows are timing charts relative to an index for illustrating the operation time of the adjustment time decision circuit of FIG. 2.
Figure 5A:
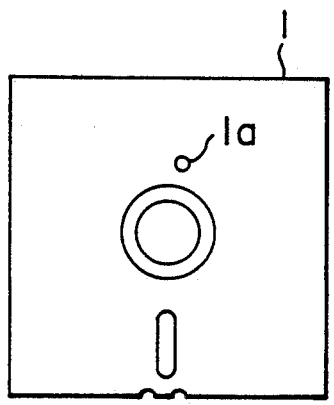
FIGS. 5A to 5C are plan views of a 8-inch FDD, a 5.25-inch FDD and a 3.5-inch FDD, respectively.
Figure 5B:
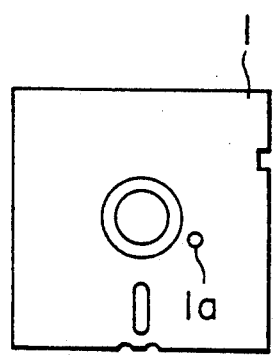
Figure 5C:
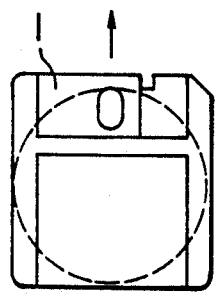
Figure 6:
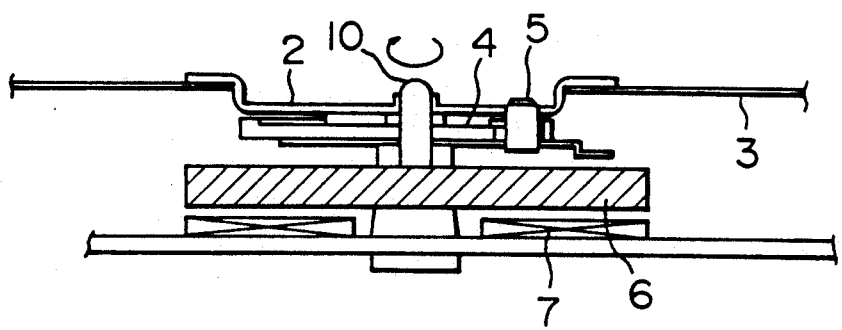
FIG. 6 is a sectional view of the conventional chucking mechanism.
Figure 7A:
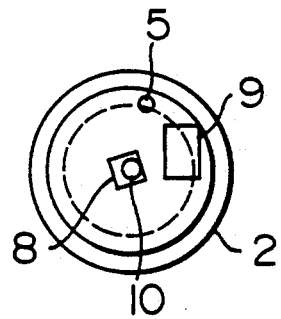
FIGS. 7A to 7C are plan views for explaining the procedure of clamping an FDD in the chucking mechanism of FIG. 6.
Figure 7B:
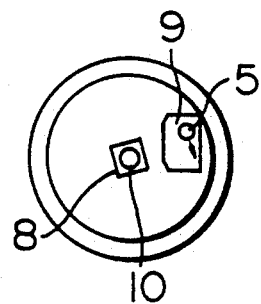
Figure 7C:
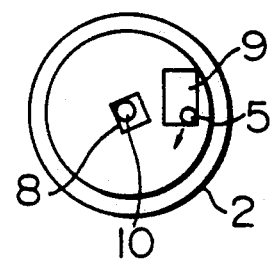
Figure 8:
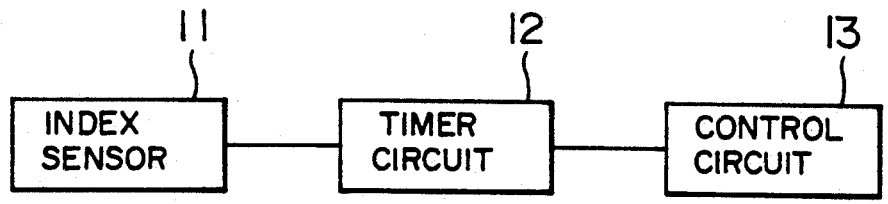
FIG. 8 is a schematic block diagram of the conventional index adjustment circuit.

With reference to FIGS. 3 and 4, an explanation will be given of the operation of the concrete example of the adjustment time decision circuit as shown in FIG. 2. FIG. 3 is a timing chart relative to the operation of the entire circuit, and FIG. 4 is a timing chart relative to an index.

First, as seen from FIG. 3(a) at a timing t1, power is turned on so that a reset signal is supplied to the OR gate 40. Then, the flip-flops 26, 27, and 28 to 31 are simultaneously reset. Next, as shown in FIG. 3(b), the drive selection signal is supplied to the OR gate 52 so that at a timing t2, the reset signal falls and also the spindle motor starts to rotate.

Thereafter, at every revolution of the spindle motor, the index detection pulse from the index sensor 21 as shown in FIG. 1 is supplied to the respective R terminals of the flip-flops 26 to 31 through the inverter 41 and the OR gate 40 in an "H" period as shown in FIG. 3(a). Then, the flip-flops 26 to 31 are reset or released.

A pulse at the reference frequency of 7.8 kHz as shown in FIG. 4(b) is supplied to the second input terminal of the AND gate 25. Thus, as shown in FIG. 4(b), a logical product of the index output pulse and the reference frequency pulse is produced at the output terminal (point A) of the AND gate 25. This output is supplied to the terminal T of the flip-flop 27. The output from the terminal Q of the flip-flop 27 is supplied to the terminal T of the flip-flop 26. Further, the output from the terminal Q of the flip-flop 28 is supplied to the terminal T of the flip-flop 29. Thereafter, the output from the terminal $\overline{Q}$ of each of the flip-flops 29 and 30 is supplied to the corresponding terminal T of each of the flip-flops 30 and 31.

Thus, the outputs from the terminals Q's and $\overline{Q}$'s of the flip-flops 28 to 31 are supplied to the first to fourth input terminals of the NAND gates 32 to 39 in the manner described previously. The NAND outputs from the NAND gates 32 to 39 are supplied to the first input terminals of the AND gates 42 to 49 in the separator circuit 200, respectively.

The first information, second information, . . . as shown in FIGS. 4(f) to 4(m) are supplied to the second to fourth input terminals of each of the AND gates 42 to 49 in accordance with predetermined correction amounts stored in the memory. Each of the AND gates 42 to 49 takes a logical product of these items of information and the output from each of the AND gates 32 to 39; the logical product is supplied to the OR gate 50. Thus, the output from the output terminal $\overline{Q}$ of the flip-flop 26 will fall 10 down as shown in FIG. 4(c).

This output is supplied to the first input terminal of the NAND gate 51. At timing t3 after supply of the index detection pulse, the delay signal as shown in FIG. 3(c) is supplied to the second input terminal of the NAND gate 51. As a result, at the timing t3, the index output will be produced through the OR gate 52, thereby enabling write or read for the medium for FDD to be made.

As understood from the above description, adjustment time decision device constructed by a digital delay circuit delays the index detection pulse by the correction amount supplied from the memory so that the adjustment time can be decided. Thus, the index can be adjusted without being influenced by ambient temperature, a used voltage, added shock, etc. Further, in accordance with this arrangement, the robot used to adjust the value of a variable resistor is not required. The tester can electrically store, a correction amount in the memory. Thus, the index can be adjusted very simply.

I claim:

1. A floppy disk drive (FDD) comprising:
an index sensor for detecting an index position of a medium for the FDD and supplying an index detection pulse when said index position is detected;
writable non-volatile memory which stores information indicative of a correction amount due to a difference between a reference index position and the index position detected by said index sensor;
an adjustment time decision circuit receiving said index detection pulse from said index sensor and said information indicating said correction amount from said non-volatile memory and including a digital delay circuit for producing a delayed index signal which is provided by delaying the index detection pulse received from the index sensor by a count value corresponding to the information indication the correction amount received from the non-volatile memory; and
an FDD control circuit for employing said delayed index signal to determine the reference position of a certain track of said medium to control said FDD.

* * * * *